H. C. HETTELSATER AND E. K. SCOTT.
SCALE AND TRANSFER CAR.
APPLICATION FILED OCT. 9, 1916.
1,393,017.
Patented Oct. 11, 1921.
6 SHEETS—SHEET 1.
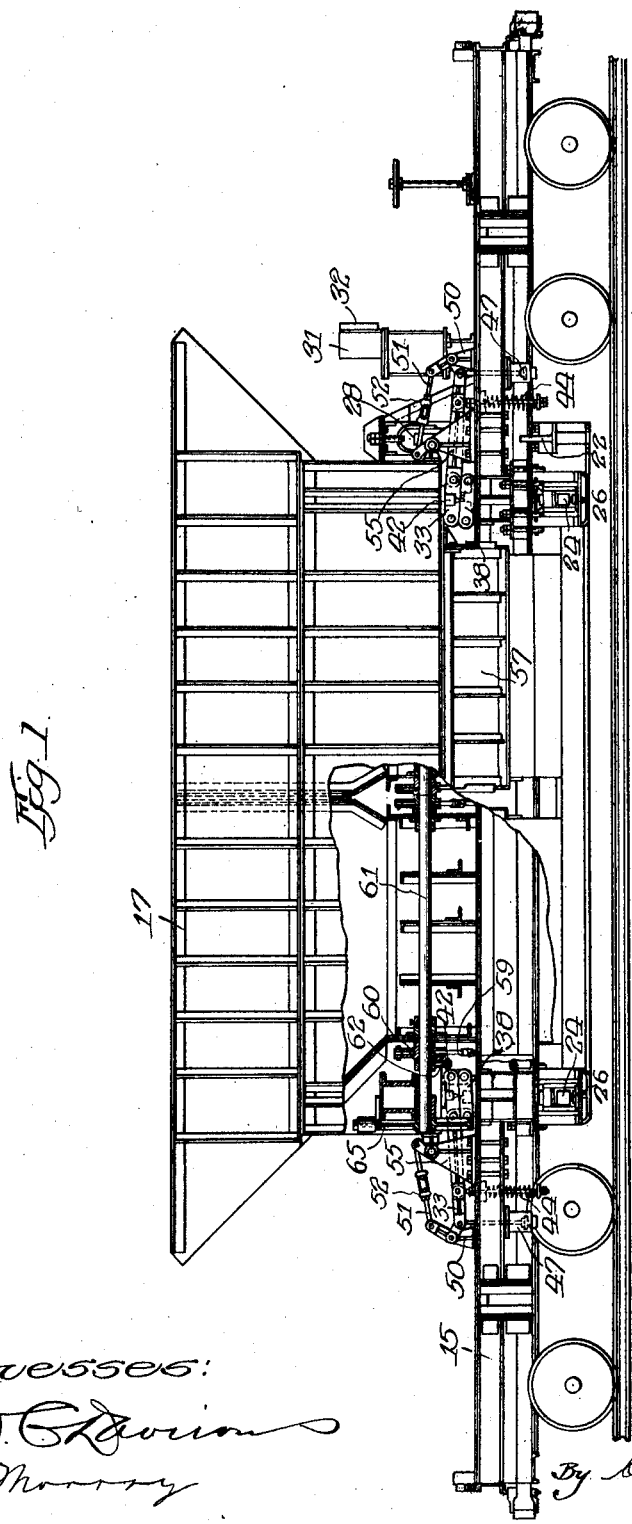

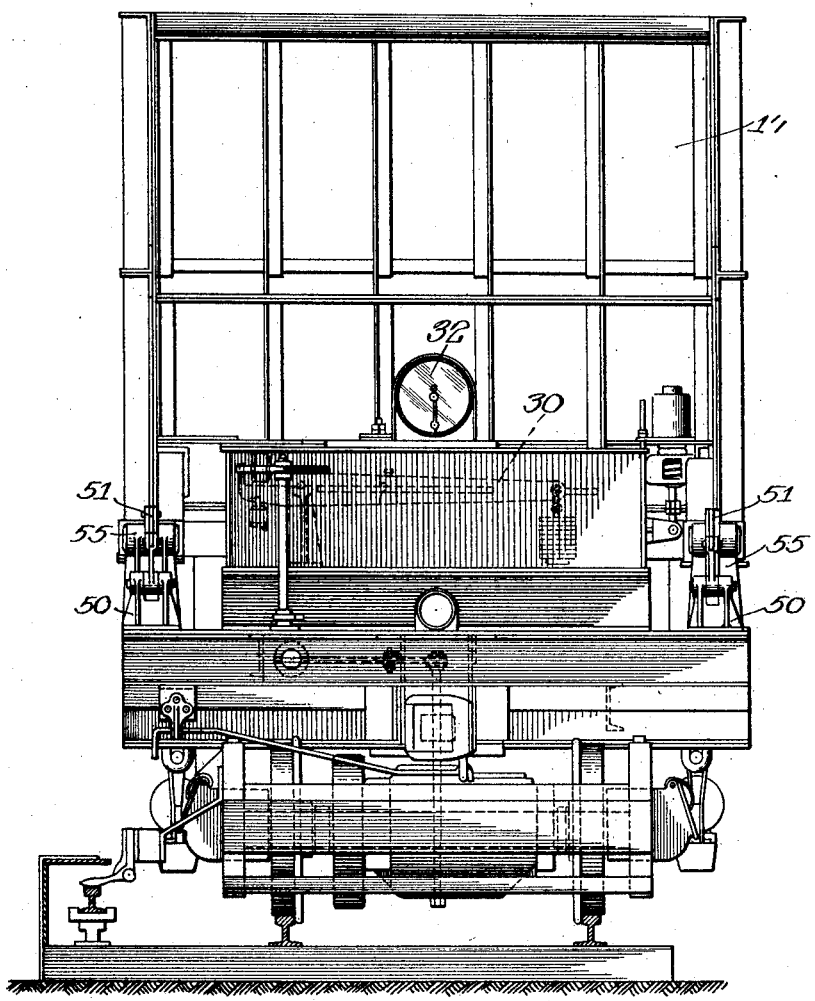

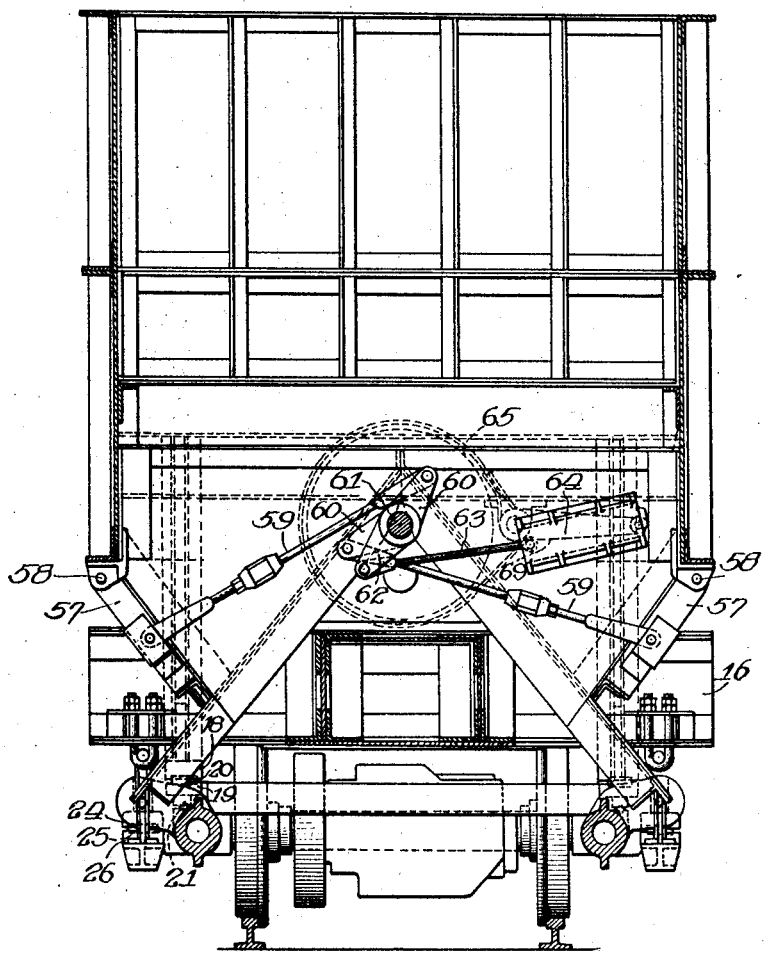

H. C. HETTELSATER AND E. K. SCOTT.
SCALE AND TRANSFER CAR.
APPLICATION FILED OCT. 9, 1916.
1,393,017.
Patented Oct. 11, 1921.
6 SHEETS—SHEET 4.
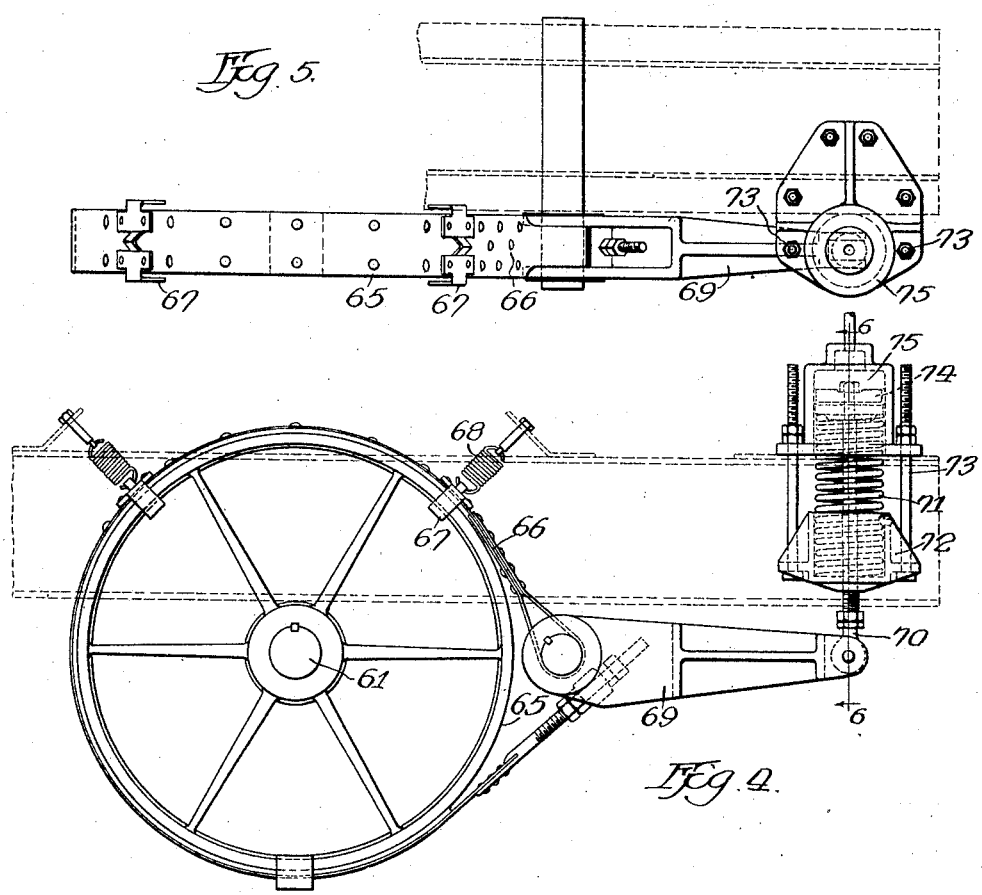
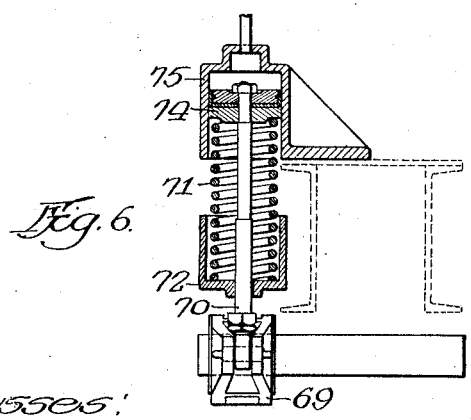

H. C. HETTELSATER AND E. K. SCOTT.
SCALE AND TRANSFER CAR.
APPLICATION FILED OCT. 9, 1916.
1,393,017.
Patented Oct. 11, 1921.
6 SHEETS—SHEET 5.
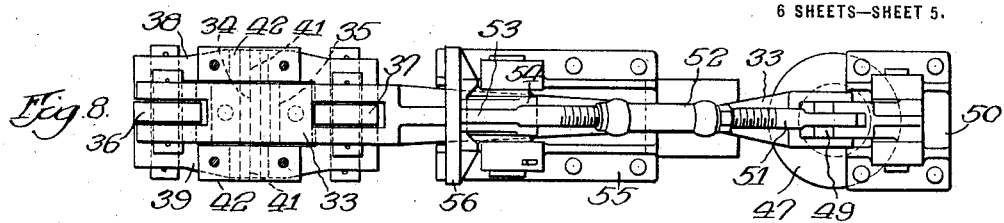
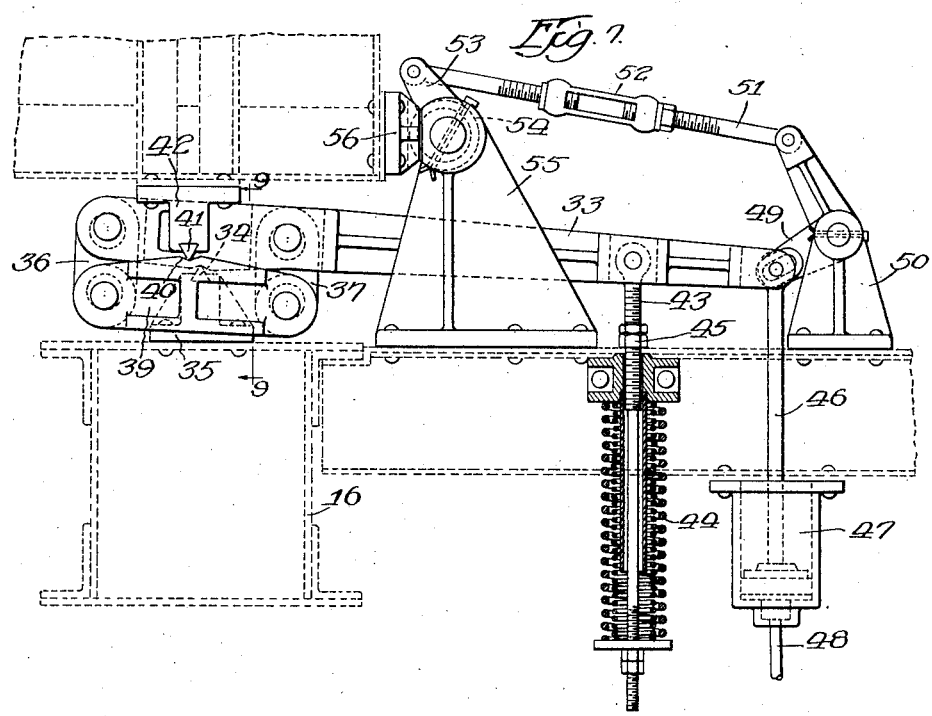
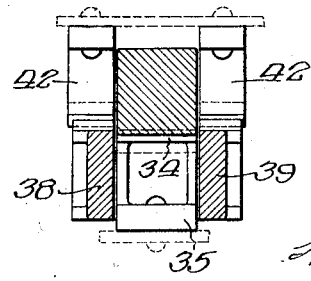

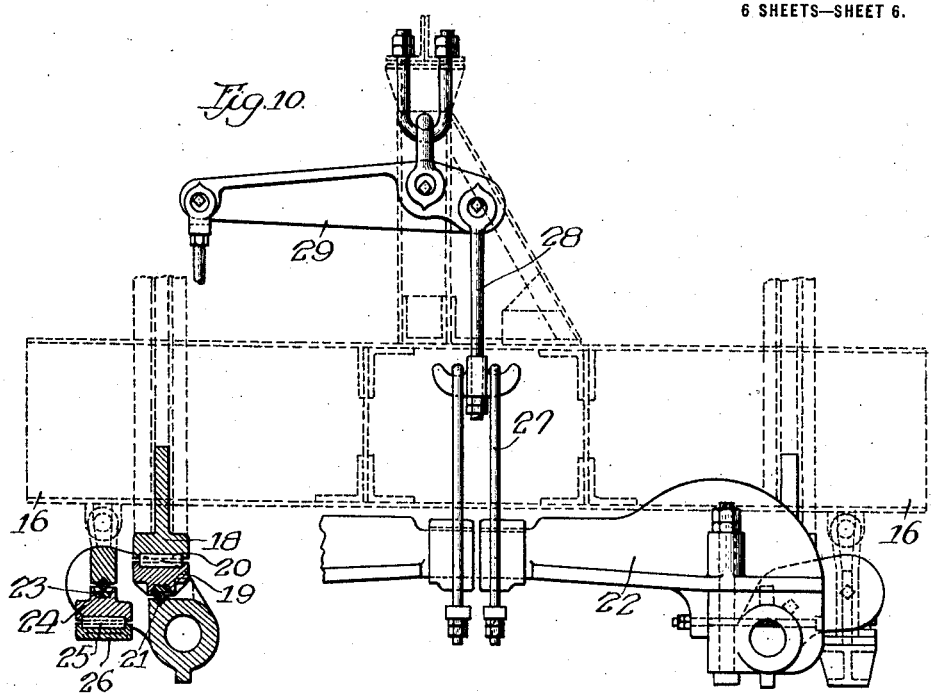
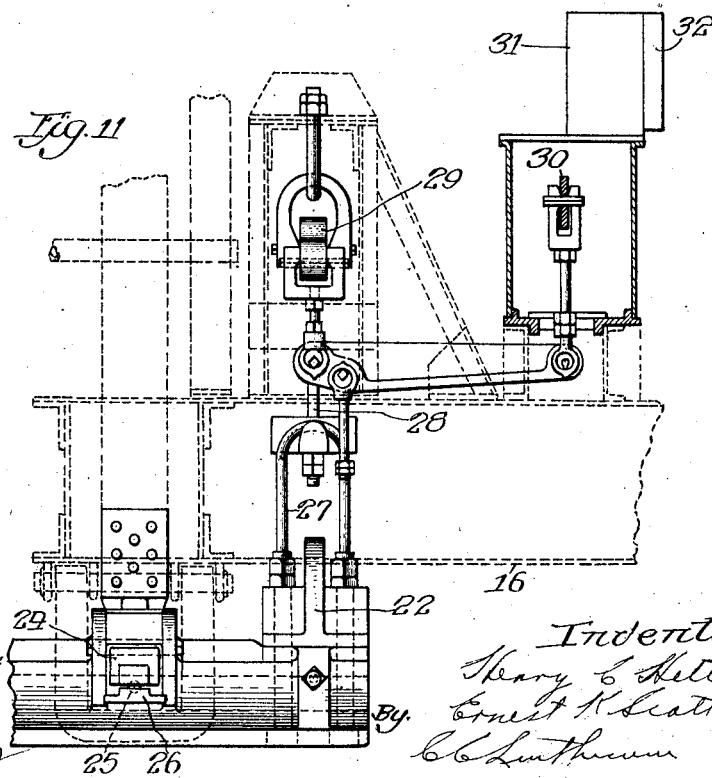

UNITED STATES PATENT OFFICE.

HENRY C. HETTELSATER AND ERNEST K. SCOTT, OF OAK PARK, ILLINOIS, ASSIGNORS TO FRANK K. HOOVER, OF CHICAGO, ILLINOIS.

SCALE AND TRANSFER CAR.

1,393,017.     Specification of Letters Patent.     Patented Oct. 11, 1921.

Application filed October 9, 1916. Serial No. 124,549.

*To all whom it may concern:*

Be it known that we, HENRY C. HETTELSATER and ERNEST K. SCOTT, citizens of the United States, and residents of Oak Park, in the county of Cook and State of Illinois, have invented certain new and useful Improvements in Scale and Transfer Cars, of which the following is a specification.

Our invention relates to apparatus intended for moving and weighing heavy materials, usually in granular form, such as usually constitute the burden of a blast furnace, and more particularly to a scale transfer car and the devices used in connection therewith.

A car body such as contemplated by us is normally supported as a whole upon knife-edge bearings, whereby the load is weighed. As the car is being transferred from place to place it of course vibrates, throwing strain upon the scale bearings and tending to distort and destroy them. There is also a tendency to crystallize and render them blunt and inaccurate. This is particularly true when passing around curves. One of the objects, therefore, of this invention is to provide means adapted to relieve all or a portion of the weight of the body and its lading from the knife-edge bearings at all times, except during the weighing operation. The desirability of relieving all or a portion of the weight of the car from the scale bearings is increased when indicating and recording mechanisms are associated with a car of the weight and capacity such as is illustrated. This for the reason that the parts of the indicating and recording mechanisms, in order to secure accurate results, must be relatively delicate and any slight imperfection or distortion of the scale mechanism or knife edges at any point will cause a relatively enormous error in the indicated weight. This therefore forms one of the important reasons why mechanism is employed which shall operate to relieve the weight from the bearings at all times except when the car is stationary and the weight is to be taken.

A further object is to provide in a scale car of this description automatic indicating and recording mechanism which shall operate cumulatively to indicate and record additions to the load as they are made.

Not only is it desirable to relieve the excessive weight placed on the knife-edge bearings during movement of the car, but at the same time it is desirable to lock the car against side and endwise swaying, such as occurs due to the unevenness of the track, the passage of the car over railroad crossings, around curves, etc. To this end we have provided means normally operative to lock the car body against any lateral or longitudinal movement and preferably so arranged as to become inoperative or inactive during the weighing operation.

Furthermore, our invention contemplates the employment of means in connection with a scale or transfer car whereby the dumping mechanism may be controlled and the discharge regulated. This arrangement of mechanism may be found to be valuable, either in connection with a scale car wherein material is dumped directly into rotating skips or in connection with a transfer car wherein the material is moved from a dock to the furnace pockets or from a storage yard to the furnace pockets. In the latter case a sudden discharge of the load tends to distribute the load over too great an area, whereas by restricting the flow, the material may be directed into a smaller space or opening.

The invention will be more readily understood by reference to the accompanying drawings, wherein—

Figure 1 is a side elevation of a scale car constructed in accordance with our invention, a portion of the body of the car being broken away to disclose the position and arrangement of the parts;

Fig. 2 is an end elevation of the car at the weighing end thereof;

Fig. 3 is a transverse vertical section illustrating somewhat in detail the door controlling and operating mechanism;

Fig. 4 is an enlarged elevation of such mechanism;

Fig. 5 is a plan view thereof;

Fig. 6 is a sectional view on the line 6—6 of Fig. 4;

Fig. 7 is an elevation of the means employed for relieving the scale bearings of weight imposed thereon, together with the means employed for locking the car body against endwise and sidewise movement;

Fig. 8 is a plan view of the construction shown in Fig. 7;

Fig. 9 is a sectional view on the line 9—9 of Fig. 7, and

Figs. 10 and 11 are elevations partially in section which show the lever arrangement employed in the weighing operations.

Referring more particularly to the drawings, it will be seen that the car frame includes longitudinal frame members 15 and transverse frame members 16. The car body 17 and the parts mounted thereon are supported on the car frame at the corners of the body through legs or standards 18, best shown in Figs. 10 and 11, which in turn bear upon shoes 19 through rollers 20. These shoes engage, through suitable knife-edge bearings 21, with levers 22, shown in side elevation in Fig. 10 and in end elevation in Fig. 11. The short ends of these levers engage through knife-edge bearings 23, shoes 24 and rollers 25 with stirrups 26 which directly engage a transverse frame member 16. The long arm of the lever 22 engages a loop 27, link 28, lever 29, etc., until the motion is finally transmitted to the scale beam 30, best shown in Figs. 2 and 11. Associated with the scale beam is suitable indicating and recording mechanism, which may be contained within the casing 31. The recording dial is indicated at 32 in Fig. 2. Inasmuch as the specific construction of the indicating and recording mechanism forms no part of this invention, I have not illustrated the same in detail. Mechanism which may be employed for this purpose is illustrated in the prior patent to Hoover and Mason, No. 932,452 of September 7, 1909. When it is considered that the weight of the car body and its load may frequently exceed one hundred and forty thousand pounds, it will be understood that the problem of maintaining accuracy in the weighing devices is a large one. It has been found that such mechanism may be constructed, but that in order to insure the satisfactory and continuous operation thereof it is best that means be provided for relieving the weight on the bearings and at the same time for restraining any tendency of the car body to sway endwise or sidewise.

This is accomplished by use of the mechanism such as shown in Figs. 1, 7, 8 and 9.

The mechanism employed for relieving the weight on the scale bearings includes a long lever 33, which engages near one end with a knife-edge bearing 34, mounted in a bracket 35, fixed to a transverse frame member 16. Connected to the lever 33 by means of links 36, 37, are side links 38, 39, the upper edges of which are notched, as at 40, to provide a bearing for the knife edges 41 carried by the brackets 42, which are secured to the car body. It will be understood that one of these devices is arranged at each of the four corners of the car. It will be seen that the leverage exerted by reason of the construction shown is in the ratio of the length of the lever to the distance between the points of the bearings 34, 41. By employing the swinging links as described a result is secured which could not be secured by using a lever having a fixed fulcrum; that is to say, even though the points 34, 41, are relatively near, the movement of a lever to the extent necessary to lift the car would require a lateral movement of the car. While this would be slight, it would assist in injuring the weight relieving knife-edge bearings and would increase friction. Therefore, the swinging links serve to maintain the knife-edge bearings in vertical alinement and to eliminate friction.

Secured near the outer end of the lever 33 is a bolt 43. A coil spring 44 is confined on the bolt, the spring tending to hold the lever 33 in the position shown in Fig. 7. The extent to which the spring is allowed to retract the lever and therefore the extent to which the car body is lifted is controlled by the nut and lock nut 45 on the bolt 43. To the extreme outer end of the lever 33 is pivoted a piston rod 46, the lower end of which carries a piston mounted in a cylinder 47, having an air connection 48 thereto. By admitting air to the cylinder 47 the lever 33 is raised, overcoming the spring 44 and allowing the car body to descend and the full weight thereof to be disposed on the scale bearings.

In order to lock and unlock the car body against swaying, we provide a bell crank 49, pivoted on a bracket 50 on the car frame, one arm of the bell crank being connected to the outer end of the lever 33 and the other arm having pivoted thereto a rod or link 51, having a turnbuckle 52 therein and connected at its opposite end to a crank 53, which operates a cam 54. The cam is mounted in a bracket 55 secured on the car frame. The cam 54 is intended to coöperate with a notched or grooved slot 56 mounted on the end of the car body, the arrangement being such that when the cam is in the position shown in Fig. 7 the body is locked both as against transverse and longitudinal movement. However, as the lever 33 is actuated through the piston in the air cylinder 47, the locking mechanism is simultaneously rendered inactive as relates to the car body.

The particular advantage in connection with a construction such as shown is that its operation is assured to relieve the weight on the scale bearings even though the operator should fail in his duty. The car could not be left with its weight on the bearings, as the spring would cause the return of the lever 33 to the position of Fig. 7. By providing a spring-returned air valve handle whereby air could not continue to be admitted to the cylinder 47, except during such time as the valve handle was held open by the operator, this result would be further assured.

As heretofore explained, it is desirable, and in fact essential, that means should be provided whereby the dumping of the doors of a car of this description should be entirely under the control of the operator and that the doors be opened as much or as little as desired. In order to accomplish this result and to insure the locking of the doors in any position desired, even without the volition of the operator, we have devised the mechanism shown in Figs. 3 to 6 inclusive. In Fig. 3 it will be seen that the doors 57 are pivoted at 58, and that their outward swinging movement is controlled by links 59, which are connected to cranks 60, mounted on a longitudinal shaft 61. A crank 62 in the shaft 60 is connected to the pitman 63 adapted for actuation by the air cylinder 64. By this means the doors may be closed, the same being opened by gravity. However, such means do not lend themselves to the control of the door or the securing of the same in any desired partially open position. In order to accomplish this result, we provide the band wheel 65, best shown in Fig. 5, which is keyed to the shaft 61. A brake band 66 encircles this wheel, being retained in alined relation by means of the U-shaped clips 67. Coil springs 68, connected to the clips and to the frame, serve to withdraw the band from the wheel when the pressure is released. A lever connection for the band is provided by means of the lever 69, to which both ends of the band 66 are connected at different points. To the other end of the lever is connected a rod 70, which has the combined function of a piston rod and a coil spring support. The spring 71 has a bearing at one end upon a support 72, this support being engaged by bolts 73, which have a bearing upon a rigid portion of the frame. The rod 70 slides freely through the support 72. The upper end of the spring 71 engages the piston 74 in an air cylinder 75. The tendency of the spring is to force the piston toward the upper end of the air cylinder and therefore to contract the band upon the band wheel. As air is admitted, however, the force of the spring is overcome and the brake band released. It will be seen that even though the operator should neglect his duty, the doors would be locked in whatever position they were left. Furthermore, it will be seen that the control of the doors by means of the mechanism shown is simple.

While we have shown a preferred embodiment of our invention and have described the most approved manner of employing the same, we do not wish to be limited to the exact form shown or described.

We claim:

1. In combination with the frame and body of a car, a weight indicating device, automatic means having a predetermined range of movement acting normally to reduce the load of the car body on the weight indicating device, and means to overcome the said automatic means and permit the load to be weighed.

2. In a car, the combination of a frame and body, means for weighing a load carried by said car, knife-edge bearings in said weighing means, means acting between said body and frame to lift said body and load and relieve said bearings, means having an adjustable range of movement acting on said lifting means to normally hold the same in body-lifting position, and means adapted to overcome said holding means and permit the weight of the load to act upon said weighing means.

3. In a car, the combination of a body and a frame, weighing and weight registering mechanism on said body, means at each end of the car acting to relieve weight from the weighing mechanism, means acting on said relieving means to normally retain the same in relieving position and an air cylinder and piston for overcoming said spring and allowing all the weight to be carried by said weighing means.

4. In a scale car, the combination of weighing means disposed between the body and the frame of the car, and automatic locking means operative independently of the relative displacement of the car body to lock said body to said frame against endwise and sidewise swaying.

5. In a scale car, the combination of weighing means disposed between the body and frame of the car, and an automatically operating locking device at each end of the car, said locking devices being adapted to lock the body to the frame against both side and endwise movement.

6. In a scale car comprising a body and a frame, the latter having body supporting means, the combination of weighing means disposed between the body and frame of the car, said body having a notch therein, and a locking device including a cam independent of the body supporting means adapted to coöperate with said notch whereby by a single actuation of said cam said body is locked against lateral and longitudinal movement.

7. In a scale car, the combination of weighing means, of means normally operative to relieve weight from the scale bearings, means for locking said car body against movement relative to said frame, said latter means being operative in unison with said weight relieving means, and means for varying the effectiveness of said locking means.

8. In a scale car, the combination of weighing means, means normally operative to relieve weight from the scale bearings of said weighing means, means for locking said car body against movement relative to the car frame, said means being adapted for operation in unison with the weight relieving means, said locking means being adapted for automatically unlocking same when the said weight relieving means are actuated to dispose the weight on the scale bearings, and means for varying the effectiveness of said locking means.

9. In a scale car, the combination of a body and frame, weighing means disposed therebetween, a lifting device arranged to act between the body and frame and lift weight from the scale bearings, power means for actuating said device in one direction and opening means for actuating it in another direction.

10. In a scale car, the combination of a body and frame, weighing means disposed therebetween, a lifting device arranged to act between the body and frame and lift weight from the scale bearings, power means for actuating said device to return the weight to the scale bearings and automatic means for restoring said device to weight-relieving position after the release of said power means.

11. In a scale car, the combination of a body and frame, weighing means disposed therebetween, a lifting device arranged to act between the body and frame and lift weight from the scale bearings, power means for actuating said device to return the weight to the scale bearings, automatic means for restoring said device to weight-relieving position after the release of said power means and body-locking means operable in unison with said weight relieving means.

12. In a car, the combination of a frame and body, means for weighing said body and its load, knife-edge bearings in said weighing means, a plurality of levers acting between said body and frame to lift said body and relieve said bearings, means acting on said levers to normally hold the same in body-lifting position, and means adapted to overcome said lever-holding means and permit the weight of the body and load to act upon said weighing means.

13. In a car, the combination of a body and a frame, weighing and weight-registering mechanism on said body, a lever at each end of the car and acting by a multiplication of motion to relieve weight from the weighing mechanism, means acting on said lever to normally retain the same in relieving position and an air cylinder and piston for overcoming said spring and allowing all the weight to be carried by said weighing means.

14. In a scale car, the combination of a body and frame, weighing means disposed therebetween, means for lifting a portion of the weight of the body and load, said means including a pair of spaced, opposed knife edges and anti-friction means on which one of said knife edges is mounted.

15. In a scale car, the combination of a body and a frame, weighing means disposed therebetween, weight relieving means, said last-named means including a pair of spaced, opposed knife edges, a series of depending links for supporting one of said knife edges and motion multiplying means acting through said spaced knife-edge bearings to normally exert a relatively great lifting capacity through a short distance.

16. In a scale car, the combination of a body and a frame, weighing means, weight-relieving means disposed between the body and frame, said weight-relieving means including knife-edge bearings rigidly held by said body, and a knife-edge bearing rigidly held by said frame, a lever contacting one of said knife-edge bearings near the end of said lever, and a suspended link from said lever, said link acting as a support for the other of said knife-edge bearings and means acting upon the outer end of said lever for exerting a force tending to pry apart the frame and body.

17. In a weighing device, a supporting frame, a body adapted to hold material to be weighed, a lever system interposed between the frame and the body, a locking device adapted to lock the body to the frame, automatic means adapted to render the lever system inoperative and to hold the locking device in locked position, and means adapted to render the lever system operative and to release the locking device simultaneously.

18. In a scale comprising a frame and a body, the combination of normally inoperative weighing means disposed between the body and the frame a locking device normally locking the body to the frame, and means adapted to render the weighing means operative and to release the locking device simultaneously.

Signed at Chicago, in the county of Cook and State of Illinois, this 7th day of October, A. D. 1916.

HENRY C. HETTELSATER.
ERNEST K. SCOTT.

Witnesses:
H. EARL HOOVER,
R. L. MILLWARD.